(12) United States Patent
Schmitt et al.

(10) Patent No.: US 11,564,389 B2
(45) Date of Patent: Jan. 31, 2023

(54) STRAW FOR CRYOGENIC PRESERVATION OF A DOSE OF LIQUID-BASED SUBSTANCE, ASSEMBLY COMPRISING SAME, AND METHOD FOR EMPTY THIS STRAW

(71) Applicant: IMV TECHNOLOGIES, Saint Ouen sur Iton (FR)

(72) Inventors: Eric Schmitt, Villaines-la-Juhel (FR); Jean-Charles Gorges, Chenay (FR); Hélène Guyomar, Saint Germain de Martigny (FR)

(73) Assignee: IMV TECHNOLOGIES, Saint Ouen sur Iton (FR)

( * ) Notice: Subject to any disclaimer, the term of this patent is extended or adjusted under 35 U.S.C. 154(b) by 323 days.

(21) Appl. No.: 16/770,124

(22) PCT Filed: Dec. 5, 2018

(86) PCT No.: PCT/FR2018/053116
§ 371 (c)(1),
(2) Date: Jun. 5, 2020

(87) PCT Pub. No.: WO2019/110927
PCT Pub. Date: Jun. 13, 2019

(65) Prior Publication Data
US 2020/0383321 A1     Dec. 10, 2020

(30) Foreign Application Priority Data
Dec. 5, 2017   (FR) ...................................... 1761670

(51) Int. Cl.
*A01N 1/02*         (2006.01)

(52) U.S. Cl.
CPC ......... *A01N 1/0268* (2013.01); *A01N 1/0257* (2013.01)

(58) Field of Classification Search
CPC ................ A01N 1/0257; A01N 1/0268; A61D 19/024
See application file for complete search history.

(56) References Cited

U.S. PATENT DOCUMENTS 6,300,125 B1   10/2001   Saint-Ramon et al.
6,416,611 B1    7/2002   Saint-Ramon et al.
(Continued)

FOREIGN PATENT DOCUMENTS

EP   0278823 A1   8/1988
EP   0873726 A1   10/1998
(Continued)

*Primary Examiner* — Elizabeth J Martin
(74) *Attorney, Agent, or Firm* — Browdy and Neimark, P.L.L.C.

(57) ABSTRACT

A straw includes a tube (11), a stopper (13) arranged in the tube and having a passage (35) extending through it, and an emptying needle (14) having a first portion (31) protruding from the stopper as far as a distal end (19) situated in the tube, and a second portion (32) situated in the passage (35) of the stopper, the needle and the stopper forming an insert (12) entirely disposed in the tube and having an internal conduit (24) fluidically connecting the internal spaces of the tube that are situated to either side of the insert, the internal conduit being formed at least in part by the needle. A method for emptying the straw includes establishing a fluidic communication between the needle and a receptacle, and making an opening in the tube in order to connect the dose of liquid-based substance to the atmosphere and allow it to flow.

15 Claims, 7 Drawing Sheets

(56) References Cited

U.S. PATENT DOCUMENTS

| | | | |
|---|---|---|---|
| 2001/0014376 A1 | 8/2001 | Saint-Ramon et al. | |
| 2002/0183653 A1 | 12/2002 | Saint-Ramon et al. | |
| 2002/0188222 A1 | 12/2002 | Saint-Ramon et al. | |
| 2018/0110604 A1* | 4/2018 | Van Kappel-Dufour | ................... A61D 19/027 |

FOREIGN PATENT DOCUMENTS

| | | |
|---|---|---|
| FR | 995878 A | 12/1951 |
| FR | 2771285 B1 | 2/2000 |
| FR | 2771284 B1 | 8/2000 |
| FR | 2784572 B1 | 2/2001 |
| FR | 2824255 B1 | 2/2004 |
| FR | 2824256 B1 | 4/2004 |
| FR | 2932064 B1 | 8/2010 |
| FR | 3036954 A1 | 12/2016 |
| WO | 2010070533 A1 | 6/2010 |
| WO | 2016193630 A1 | 12/2016 |

\* cited by examiner

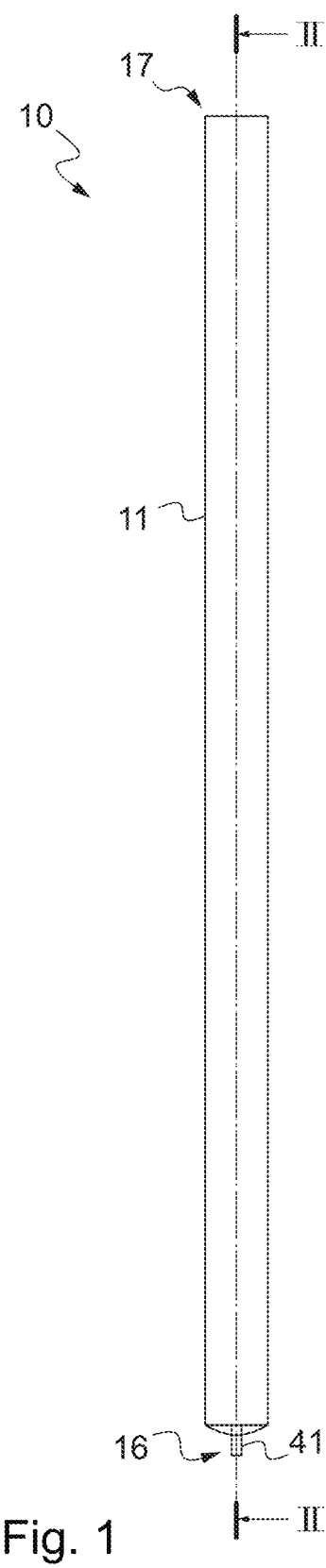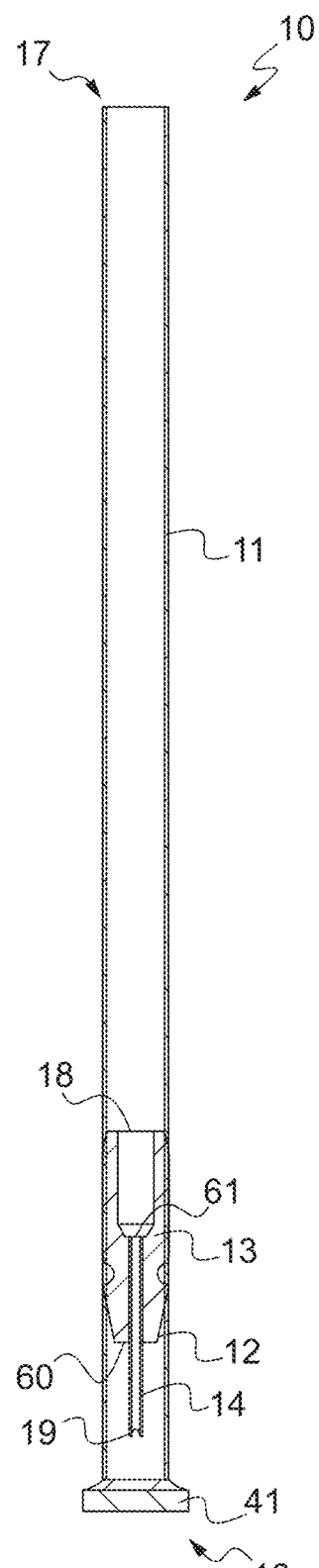

STRAW FOR CRYOGENIC PRESERVATION OF A DOSE OF LIQUID-BASED SUBSTANCE, ASSEMBLY COMPRISING SAME, AND METHOD FOR EMPTY THIS STRAW

FIELD OF THE INVENTION

The invention generally relates to the preservation of a predetermined dose of liquid-based substance, and more particularly to the straws for performing such preservation.

TECHNOLOGICAL BACKGROUND

It is known that such a straw comprises a tube and a stopper disposed in the tube. The stopper is usually of the three-part type originally described in French patent 995.878, corresponding to British patent 669,265, i.e. formed by two plugs made from a fibrous substance enclosing a powder which, on contact with a liquid, transforms into an impermeable paste or gel adhering to the wall of the tube so that the stopper is liquid-tight. Similar but improved stoppers are described by the French patent applications 2 824 255 and 2 824 256, corresponding to the U.S. patents 2002/0183653 and 2002/0188222. Stoppers of another type are also known, for example a stopper comprising or associated with an insert described by French patent application 2 771 284 corresponding to U.S. Pat. No. 6,300,125, by French patent application 2 771 285 corresponding to U.S. patent 2001/0014376, by French patent application 2 784 572 corresponding to U.S. Pat. No. 6,416,611 and by French patent application 2 932 064; or for instance a stopper made from a one-piece cylinder of hydrophobic microporous material described by European patent application 0 873 726; or lastly a stopper made from a one-piece cylinder of sintered self-sealing microporous material described by PCT application WO 2010/070533.

In the initial state, the stopper is disposed in the neighborhood of one of the ends of the tube and it is provided that in the filled state, the dose of liquid substance which must be preserved in the straw is disposed between the stopper and the other end of the tube (the end furthest from the stopper). To fill the straw, the end closest to the stopper is placed in communication with a vacuum source while the end furthest from the stopper is placed in communication with a vessel containing the substance to be introduced into the straw. The air initially contained between the stopper and the end of the tube furthest from the stopper is sucked through the stopper while the substance moves forward into the tube until it meets the stopper.

If necessary, after filling, the straw is welded close to one or both of its ends and is stored cold. The straw and in particular the material of the tube are provided such that this cold storage can be implemented by plunging the straw into a liquid cryogenic agent such as liquid nitrogen.

To empty the straw, if necessary after cutting the welded end portions and thawing, there is inserted into the tube by the end closest to the stopper a rod which comes to bear against the stopper. Using this rod, the stopper is made to slide in the manner of a piston towards the end furthest from the stopper, which causes the expulsion of the dose of substance which had been introduced into the straw. When the straw is used to preserve diluted animal semen, in particular bovine semen, the emptying of the straw is carried out to perform an artificial insemination.

A similar straw has already been proposed (see French patent application 3 036 954 to which corresponds international application WO 2016/193630) which is similar but of which the stopper:

is fixed relative to the tube;
 comprises a male connector tip extending between a first end facing towards the first end of the tube and a second end facing towards the second end of the tube, having a frusto-conical external surface in accordance with a standard increasing in diameter from the first end of the tip towards the second end of the tip, the tip being configured in order that a syringe needle having a female connector tip with a frusto-conical internal surface in accordance with a standard can be connected to the stopper by engagement of the female connector tip of the needle on the male connector tip of the stopper with the internal frusto-conical surface of the female tip in contact with the external frusto-conical surface of the male tip; and
 comprises an internal duct extending between the first end of the tip and the second end of the stopper.

The internal duct of the syringe needle can thus be placed in communication, via the internal duct of the stopper, with the internal space of the tube situated between the second end of the stopper and the second end of the tube.

This internal space of the tube is provided, as in conventional straws, to receive the predetermined dose of liquid-based substance.

If a syringe needle (for example an injection needle) is connected onto the tip of the stopper and the dose of substance contained in the straw is drawn towards the stopper, the substance will pass through the internal duct of the stopper then the internal duct of the needle and it will be possible for it to be expulsed at the distal end of the needle, that is to say the pointed end situated at the opposite end to the female tip of the needle.

Such a straw can thus play not only the role of a member for packaging the dose of substance enabling it to be preserved, including at cryogenic temperatures (conventional role for a straw), but also the role of a syringe body to which may be directly connected a syringe needle and of which the content may be ejected through the distal end of that needle.

SUBJECT OF THE INVENTION

The invention is directed to providing a similar straw but which is even simpler and more convenient for the user.

To that end the invention provides a straw for the cryogenic preservation of a predetermined dose of liquid-based substance, comprising a tube extending between a first end and a second end, and a stopper disposed in said tube in the neighborhood of its first end and extending between a first end oriented towards the first end of said tube and a second end oriented towards the second end of said tube, said stopper being fixed relative to said tube and being passed through from its first end to its second end by a passage; characterized in that it further comprises an emptying needle comprising a first portion projecting from the first end of said stopper towards the first end of said tube and extending to a distal end situated in said tube, and comprising a second portion situated in said passage of the stopper, said emptying needle being permanently fastened to said stopper by its second portion, said emptying needle and said stopper forming an insert entirely disposed in said tube and presenting an internal duct fluidically connecting the internal spaces of the tube situated on opposite sides of said insert, said internal duct being formed at least partly by the internal space of the emptying needle, which is hollow.

Thus, in contrast to the earlier straw mentioned above, there is no need to have a syringe needle and to connect that syringe needle onto the tip of the stopper, the emptying needle already being present in the straw.

This is particularly simple and convenient for the user while maintaining his or her safety during manipulations of the straw, in particular during its filling or its putting into place in and its withdrawal from a bath of cryogenic agent, given that contact with the needle is avoided by the tube, the needle being entirely inside the latter, including its distal end.

The invention is based on the observation that it is in fact possible to preserve a straw containing an emptying needle in a conventional bath of cryogenic agent, despite the thermal constraint, the constraint of the predetermined length of the straw (of the order of 130 mm) imposed by conventional baths of cryogenic agent and the constraint of containing the predetermined volume of the dose of substance to preserve (for example 2 ml).

As a matter of fact, it proves to be possible to select the material of the needle in order for it to be compatible with cryogenic temperatures (for example AISI 304L stainless steel) and to compensate for the loss in useful length of the straw due to the presence of the needle by an increase in diameter of the tube, which ultimately can be moderate (to have a same cylindrical volume with different lengths and diameters, the ratio of the diameters is the square root of the inverse of the ratio of the lengths, for example if the length is divided by 4 a diameter multiplied by 2 is required).

According to advantageous features, said second portion of the emptying needle extends between the first end of the stopper and a proximal end situated in the stopper, said internal duct being formed by said passage between the proximal end of the emptying needle and the second end of the stopper.

Thus, the second portion of the needle is shorter than the stopper, and the needle thus only partly forms the internal duct of the insert. The part of the internal duct formed by the passage provided in the stopper may thus have dimensions that are independent of the needle.

According to advantageous features, in an initial state of the straw, in which it is ready to be filled, the first end of said tube is welded, the second end of said tube is open, and the space between the second end of said stopper and the second end of said tube is empty.

The closure by welding of the first end of the tube of the straw gives the user both excellent safety and excellent convenience of use since all the user is left to do is to fill the straw and, according to requirement, to close the second end of the straw by welding.

According to advantageous features, in the initial state of the straw, said internal duct of said insert is open and the space between the first end of said stopper and the first end of said tube only contains said emptying needle.

Due to the closure by welding of the first end of the tube and due to the contact between the tube and the stopper which is fluid-tight to gases and liquids, the internal space of the tube situated between the first end of the tube and the first end of the stopper is closed with only the internal duct of the insert, which is open, as an exit.

It turns out in fact that when the straw is filled, for example using a needle which is inserted into the tube by its second end until the end of the needle is close to the stopper with the substance then being injected into the tube at the same time as the needle withdraws, the substance does not penetrate, or penetrates very little, inside the internal duct of the insert and this can remain the case, including if the filled straw is placed upright with the first end downward, the capillary forces in the duct of the insert and/or the compression of the air trapped inside the internal space of the tube situated between the first end of the tube and the first end of the stopper, opposing the advancement of the substance in the duct of the insert.

It is thus not useful to close the duct of the insert to avoid the substance passing through the insert and entering the internal space of the tube situated between the first end of the tube and the first end of the stopper.

This simplifies the use of the straw since the user has no manipulation of opening the duct of the insert to perform when he or she has to empty the straw.

According to advantageous features, in a filled state of the straw, the first end of said tube is welded, the second end of said tube is welded, and the space between the second end of said stopper and the second end of said tube contains said predetermined dose of liquid-based substance.

The closure by welding of both ends of the straw provides particularly high safety for the cryogenic preservation of the substance, in particular with regard to cross-contamination.

Furthermore, this gives the particularly simple and convenient possibility of emptying the straw in the manner of an ampule, first of all by opening the tube in the neighborhood of the first end (for example by cutting the tube around the stopper) then near the second end (for example by perforating the tube to connect it to the atmosphere), the substance remaining in the tube provided that the tube is not opened near its second end.

According to advantageous features, for the reasons stated above, in the filled state of the straw, said internal duct of said insert is open and the space between the first end of said stopper and the first end of said tube only contains said emptying needle.

According to other advantageous features:
said stopper comprises an annular groove on its external surface, and comprises from said annular groove to said first end an appendix of which the external surface is away from the internal surface of said tube; and/or
said stopper comprises a cylindrical portion on its external surface, in tight contact with the internal surface of said tube.

According to another aspect, the invention also relates to an assembly comprising a straw as disclosed above and a device for connection to the atmosphere of said straw comprising a positioning member of said straw configured to receive said straw in a predetermined position, and an opening member of said straw configured to make an opening in the tube of said straw when said straw is received in said positioning member in said predetermined position.

By virtue of this device for connection to the atmosphere, the user can use the straw according to the invention very conveniently, in particular in the manner of an ampule as indicated above, in a particularly reliable way since the straw is opened in the neighborhood of the second end of the tube exactly at the intended location.

According to advantageous features:
said positioning member comprises a channel configured to receive said straw in a predetermined orientation which said straw presents when it is in said predetermined position, and a stop wall situated at a location that is in line with said channel and configured to limit the pushing-in of said straw into said channel when said straw is pushed into said channel and reaches said predetermined position;

said opening member comprises a ventilation needle provided with an internal lumen and configured to pierce through the tube of said straw so as to make said opening; and said opening member further comprises an air filter situated at an entrance of said internal lumen; and/or said device for connection to the atmosphere comprises a clamp provided with a first jaw and with a second jaw, said clamp having an open configuration in which said jaws are away from each other and said straw can be disposed between said jaws, and a closed configuration in which said jaws are near each other and are configured to hold said straw received in said positioning member in said predetermined position, said positioning member being situated on said first jaw and said opening member being situated on said second jaw, and said clamp is configured such that said opening member makes said opening in the tube of said straw when said jaws are brought towards each other to pass said clamp from its open configuration to its closed configuration.

According to another aspect, the invention is also directed to a method for emptying a straw as disclosed above, comprising the steps of:

selecting a said straw in which the second end of said tube is welded, and the space between the second end of said stopper and the second end of said tube contains said predetermined dose of liquid-based substance;

establishing fluidic communication between said emptying needle and a vessel into which said predetermined dose of liquid-based substance is to be transferred, said straw being disposed such that the distal end of said emptying needle is oriented downward while being at least partly over said vessel and such that the second end of said tube is oriented upward;

making an opening in the tube of said straw to connect said predetermined dose of liquid-based substance to atmosphere, and leave said liquid-based substance to run by gravity through the internal duct of said insert.

The emptying is thus carried out without an action for driving the substance having to be carried out by the user, which is particularly simple and convenient.

What is more, this provides the advantage of minimizing the stress undergone by the substance which was preserved in the straw, which is particularly advantageous when it is a biological substance, for example concentrated vaccine.

According to advantageous features:

the method comprises the step of selecting said straw with an air bubble trapped between the dose of liquid-based substance and the second end of said tube and the step of making said opening at the location of said air bubble; and/or the method comprises the step, before making said opening, of pushing said emptying needle into a septum of said vessel.

BRIEF DESCRIPTION OF THE DRAWINGS

The disclosure of the invention will now be continued with the detailed description of embodiments, given below by way of non-limiting illustration, with reference to the appended drawings. In these:

FIG. 1 is a view in elevation of a straw according to the invention, in an initial state in which it is empty and ready to be filled;

FIG. 2 is the section view thereof on II-II of FIG. 1;

DETAILED DESCRIPTION OF EMBODIMENTS

Figure 3:
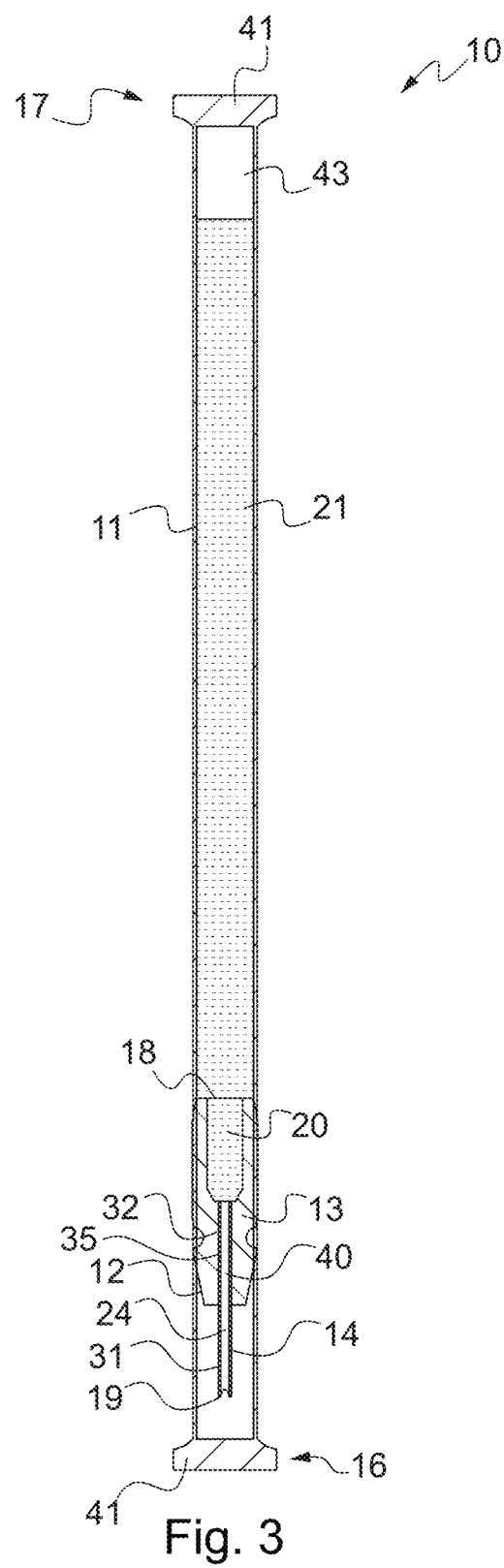
FIG. 3 is a view similar to FIG. 2 but showing the straw in the filled state.

The straw 10 illustrated in FIGS. 1 and 2 comprises a tube 11 and an insert 12 fully disposed inside the tube 11.

The tube 11 is of extruded plastic material such that it is a single piece and has a uniform cross-section, here circular.

Here, the inside diameter of the tube is of the order of 5.50 mm and the length of the tube 11 is of the order of 130 mm.

The tube 11 extends between a first end 16 (which can be seen at the bottom in FIGS. 1 and 2) and a second end 17 (which can be seen at the top in FIGS. 1 and 2).

The material of the tube 11 is here of Surlyn®, which has good properties of weldability and an excellent compatibility with cryogenic temperatures. For more detail, reference may be made to the French patent application 2 651 793 to which corresponds U.S. Pat. No. 5,190,880.

As a variant, the material of the tube is of another thermo-weldable plastic material that withstands cryogenic temperatures, for example PVC, PETG, PCTG, TPE or PP.

The insert 12 extends between a first end 19 oriented towards the first end 16 of the tube 11 and a second end 18 oriented towards the second end 17 of the tube 11.

The insert 12 comprises a stopper 13 and a emptying needle 14 fastened permanently to the stopper 13.

The stopper 13 is of a material which has the same properties of impermeability to gases and liquids with and without prior contact of the stopper with a liquid, in particular an aqueous liquid.

In particular, contrary to the conventional stoppers of straws, the stopper 13 does not comprise a sealing agent of powder in the dry state that transforms into paste or gel once moistened.

The material of the stopper 13 is polyester here, more particularly poly(butylene terephthalate). As a variant, the stopper 13 is of another thermoplastic material that is relatively rigid, for example a styrene polymer, more specifically acrylonitrile butadiene styrene (ABS).

Here, the material of the stopper 13 has a density such that the weight of the stopper 13 is sufficient for the straw 10, when it is in the filled state shown in FIG. 3, cannot float at the surface when it is plunged into a cryogenic agent in the liquid state such as nitrogen.

The needle 14 is of the hypodermic syringe needle type, but formed solely by a hollow shaft.

The needle 14 extends between a distal end 19, oriented towards the first end 16 of the tube 11, and a proximal end 61 oriented towards the second end 17 of the tube 11.

The distal end 19 is beveled in order to be pointed.

The needle 14 has an internal space forming an internal lumen 40 opening through the distal end 19 and through the proximal end 61.

In other words, the internal lumen 40 extends from the proximal end 61 of the needle 14 to the beveled distal end 19 of the needle 14.

The hollow shaft here has an outside diameter known as gauge 18 or gauge 20. The hollow shaft here is formed from a metal material, and more specifically from stainless steel.

Here, in order for the material of the needle to be compatible with cryogenic temperatures, this is AISI 304L stainless steel. It is known that stainless steel is austenitic and that austenitic steels generally have good resistance to cold, and that in particular, contrary to other steels, they do not become brittle at low temperatures.

The insert 12 is manufactured by molding the stopper 13 over a portion of the needle 14. In other words the needle 14 has the stopper 13 molded partially over it.

The stopper 13 is disposed in the tube 11 in the neighborhood of its first end 16. The stopper 13 extends between a first end 60 from which projects the needle 14 and the second end 18, which is thus both the second end of the insert 12 and the second end of the stopper 13.

The stopper 13 has a passage 35 which passes through it from its first end 60 to its second end 18.

The needle 14 comprises a first portion 31 which projects from the stopper 13, and a second portion 32 which is situated in the passage 35 of the stopper 13.

The needle 14 is permanently fastened to the stopper 13 by its second portion 32, here due to the fact that the material of the stopper 13 is molded over the needle 14.

The first portion 31 projects from the first end 60 of the stopper 13 towards the first end 16 of the tube 11 and extends to the distal end 19, which is thus both the first end of the needle 14 and the first end of the insert 12.

The second portion 32 extends from the first end 60 of the stopper 13 to the proximal end 61.

The end 61 of the needle 14 is here situated in the stopper 13, and more specifically in its passage 35.

The internal lumen 40 of the needle 14 thus opens at the proximal end 61 of the needle 14, inside the portion of the passage 35 situated between the proximal end 61 and the second end 18, which portion of the passage 35 forms an internal duct 20 of the stopper 13.

Thus, the needle 14 is in fluidic communication with the internal duct 20 of the stopper 13.

The diameter of the internal lumen 40 is here of the order of 0.84 mm.

In general the stopper 13 has an axisymmetrical configuration and it is disposed coaxially to the tube 11.

The stopper 13 is fastened directly to the tube 11.

The needle 14 is mechanically connected to the tube 11 solely via the stopper 13.

Thus, the tube 11 leaves the external surface of the needle 14 free.

Figure 9:
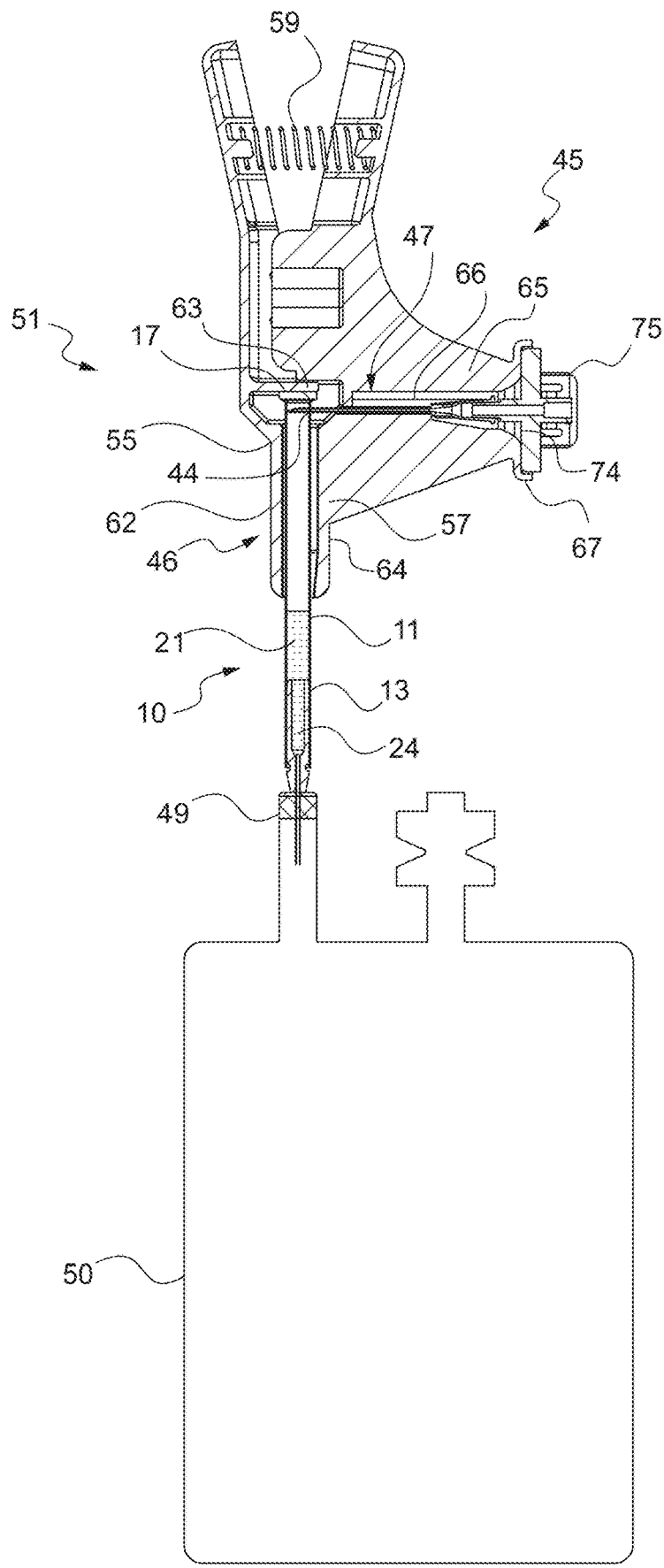
FIG. 9 is a diagrammatic view in cross-section showing the straw of FIG. 8 cooperating with a device for connection to the atmosphere and pricked into a dilution bag into which is to be transferred the predetermined dose of liquid-based substance it contains.

As explained in more detail later, the needle 14 is configured to be pushed into the septum 49 of a vessel, such as a dilution bag 50, containing a dilution liquid (for example water for injection) for concentrated vaccine solution (FIG. 9).

Figure 7:
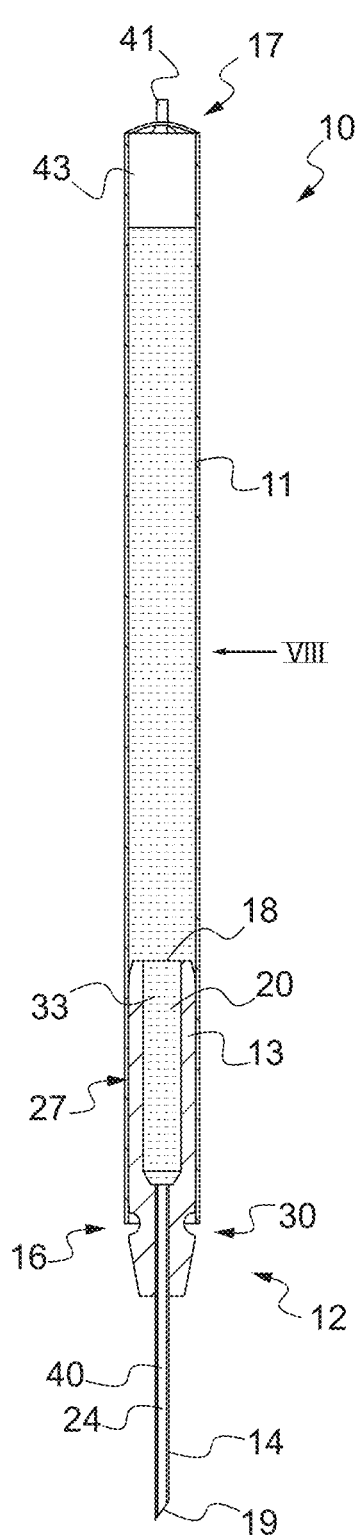
FIG. 7 is a similar view to FIG. 3, but for a variant of the straw and in a state in which it is ready to be pricked into a vessel into which the predetermined dose of liquid-based substance it contains is to be transferred.
Figure 8:
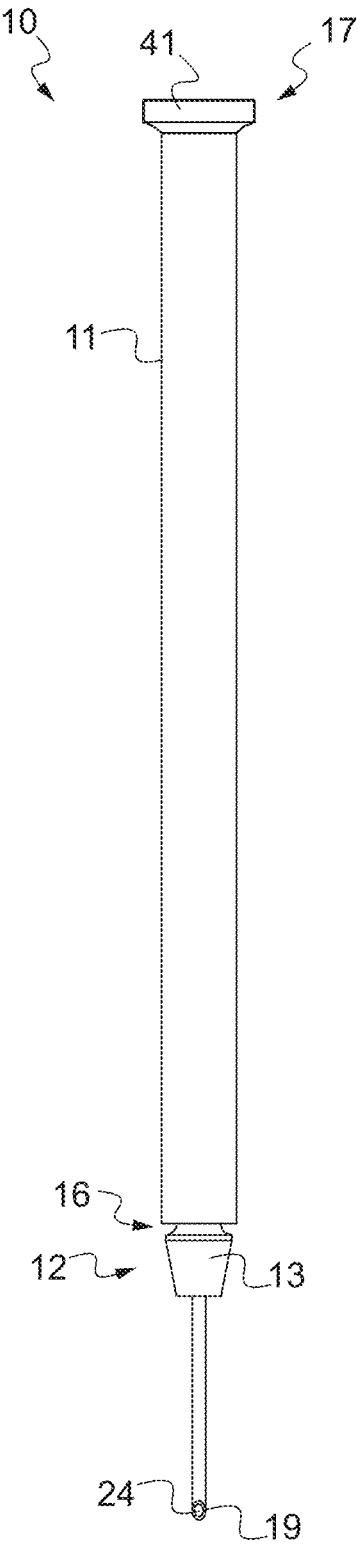
FIG. 8 is the elevation view identified by VIII of FIG. 7.

Furthermore, if necessary, the portion of the tube 11 surrounding the needle 14 may be cut and removed, as shown in FIGS. 7 and 8.

Prior to the initial state of the straw 10 illustrated in FIGS. 1 and 2, neither the first end 16 nor the second end 17 of the tube 11 are welded, and the distal end 19 of the needle 14 is situated in the tube 11 at a certain distance from the first end 16 of the tube 11.

This distance was predetermined in order for it to be sufficiently great for it to be possible to weld the tube 11 in the neighborhood of the end 16.

Once the first end 16 of the tube 11 has been welded, the straw 10 is in the initial state illustrated in FIGS. 1 and 2, in which it is ready to be filled with a dose of liquid-based substance which is to be preserved in the straw 10.

In practice, the straw 10 is provided to the user in the initial state.

The liquid-based substance here is a concentrated vaccine solution.

In the filled state of the straw 10 (FIG. 3), the dose of liquid-based substance 21 is disposed between the stopper 13 and the end 17 of the tube 11 which is the furthest from the stopper 13.

The straw 10 illustrated in FIGS. 1 to 3 here has a useful capacity of approximately 2 ml.

The implementation of the filling operation will be explained later.

After filling, the tube 11 of the straw 10 is welded in the neighborhood of its second end 17 (FIG. 3) and is placed in cold storage. The straw 10 is for example plunged into a bath of cryogenic agent in the liquid state, such as liquid nitrogen, to freeze the substance 21. In the bath, the straw 10 is disposed in an upright position, the point of the needle 14 oriented upwards.

The implementation of the emptying of the straw 10, if necessary after thawing and cutting one or both welded end portions, will be explained later.

Of course, if the tube 11 has been welded at one end and the welded portion has then been cut and removed, the tube 11 then has a new end that is set back relative to the initial end. Similarly, if the tube 11 has been cut to remove an end portion initially situated around the needle 14, the tube 11 then has a new end set back relative to the initial end. In the interest of simplification, below the numerical reference 16 will also be used for the new end of the tube 11 set back in this way relative to the initial end.

On manufacture of the straw 10, the insert 12 is fitted into the tube 11 simply by insertion through the first end 16 of the tube 11 and forced sliding towards the second end 17 of the tube 11 to reach the location provided for the insert 12 in the tube 11.

The fact that the stopper 13 can only slide in the tube 11 if a high force is applied (forced character of this sliding) makes it possible to provide sufficient holding in place of the stopper 13 in the tube 11 to take up the forces applied at the time of the pushing-in of the needle 14 into the septum 49 of the dilution bag (FIG. 9).

Figure 4:
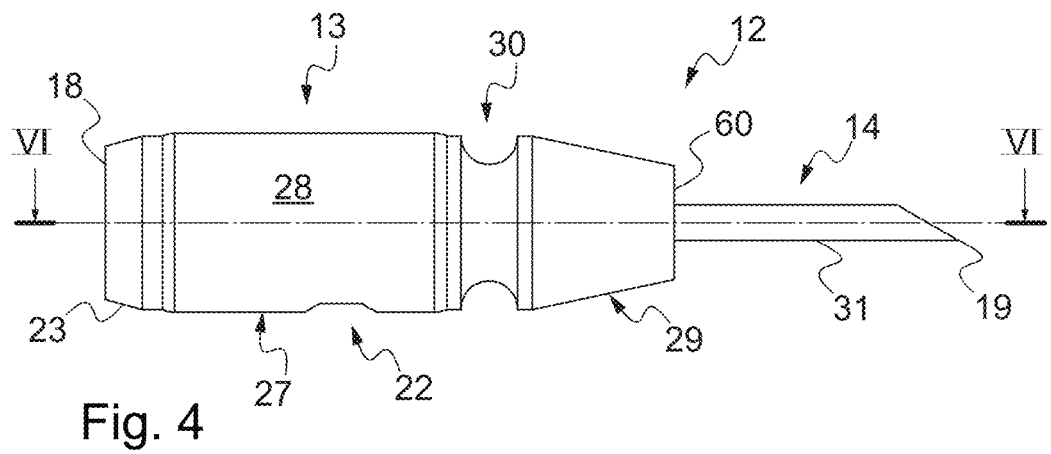
FIG. 4 is a view in elevation of the insert which that straw comprises.
Figure 5:
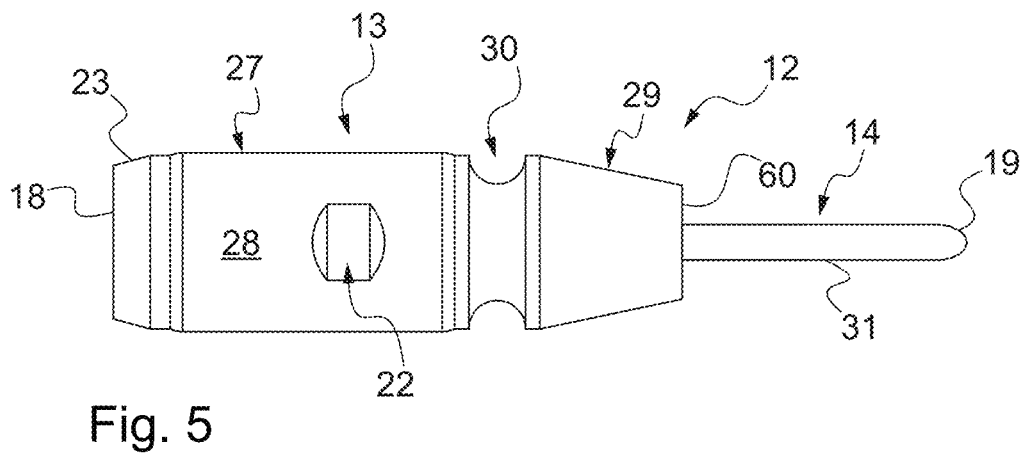
FIG. 5 shows the insert as viewed from the side that can be seen at the bottom in FIG. 4.
Figure 6:
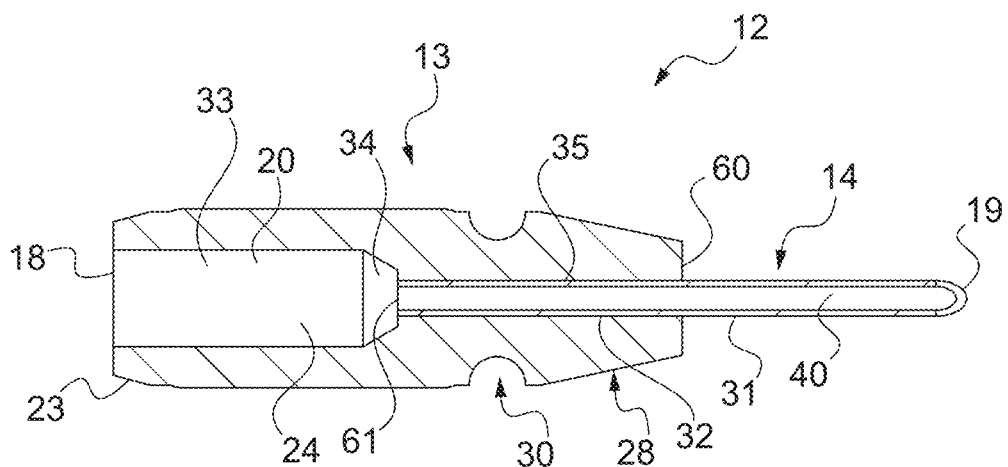
FIG. 6 is the cross-section view thereof on VI-VI of FIG. 4.

The insert 12 is described in more detail below with reference to FIGS. 4 to 6.

The stopper 13 here has a length of the order of 20 mm.

The internal duct 20 has a cylindrical first portion 33 which extends from the second end 18 of the stopper 13, and a frusto-conical second portion 34 which extends with its diameter decreasing from the first portion 33 to the end 61 of the needle 14.

The portion 33 of the internal duct 20 opens through the end 18 of the stopper 13. The portion 33 of the internal duct 20 here has a length of the order of 8.80 mm, and a diameter of the order of 3.4 mm.

The stopper 13 has a lateral external surface 28 extending from the first end 60 to the second end 18 of the stopper 13.

The material from which the stopper 13 is made is relatively rigid and in any case more so than the wall of the tube 11 which is relatively thin.

The lateral external surface 28 has a cylindrical first portion 27.

The stopper 13 has a recess 22 set back relative to the first portion 27 of the external surface 28.

On manufacture of the stopper 13, the point of injection of the material is situated in the recess 22, in order to avoid there being material projecting from the portion 27.

To immobilize the stopper 13, and more generally the insert 12 relative to the tube 11, the portion 27 is in tight contact with the internal surface of the tube 11 of the straw 10.

To obtain this tight contact, the general diameter of the external surface 28 in the first portion 27 (diameter of the surface 28 outside the recess 22) is greater than the inside diameter of the tube 11, here of the order of 0.1 mm.

The lateral external surface 28 furthermore has a frusto-conical second portion 29 forming an appendix extending from the first end 60 of the stopper 13 with its diameter increasing towards the second end 18 of the stopper 13.

It will be noted here that the cylindrical portion 27 of the surface 28 and the internal surface of the tube 11 have a surface state such that their contact zone is fluid-tight to gases and to liquids.

The stopper 13 furthermore has an annular groove 30, provided on the external surface 28 near the first end 60.

More specifically, the annular groove 30 is provided between the first end 60 and the cylindrical first portion 27, and still more specifically between the frusto-conical second portion 29 and the cylindrical first portion 27.

The annular groove 30 has a concave curved bottom surface.

The annular groove 30 is useful to guide the cutting of the tube 11, for example with a pair of scissors with curved blades.

For more detail, reference may be made to the aforementioned French patent application 3,036,954.

The stopper 13 furthermore has, at the end 18, a chamfered edge forming a guide surface 23 inclined towards the interior and towards the end 18 of the stopper 13.

The guide surface 23 makes it possible to facilitate the insertion of the insert 12 through the first end 16 of the tube 11 when the straw 10 is manufactured.

A description will now be given in more detail of the needle 14.

The part of the needle 14 projecting from the stopper 13 here has a length of the order of 10 mm. The part of the needle 14 molded over by the stopper 13 here has a length of the order of 10 mm.

It will be noted here that the internal duct 20 of the stopper 13 and the internal lumen 40 of the needle 14 together form an internal duct 24 of the insert 12, which internal duct 24 extends between the first end 19 of the insert 12 (distal end 19 of the needle 14) and the second end 18 of the insert 12 (second end 18 of the stopper 13).

More specifically, the internal lumen 40 of the needle 14 forms the portion of the internal duct 24 which extends between the first end 19 of the insert 12 and the proximal end 61 of the needle 14, while the internal duct 20 of the stopper 13 forms the portion of the internal duct 24 which extends between the proximal end 61 of the needle 14 and the second end 18 of the stopper 13.

The internal duct 24 thus passes through the needle 14 and the stopper 13 opening into the internal space of the tube 11 provided to be filled by the substance 21.

In general terms, the internal duct 24 fluidically connects (that is to say establishes fluidic communication between) the internal spaces of the tube 11 situated on opposite sides of the insert 12.

It will be noted that in the initial state of the straw 10, in which it is ready to be filled, the internal duct 24 is open. In other words the internal duct 24 establishes fluidic communication between the internal space of the tube 11 situated between the first end 60 of the stopper 13 and the first end 16 of the tube 11 (in which space is located the projecting portion of the needle 14) and the internal space of the tube 11 situated between the second end 18 of the stopper 13 and the second end 17 of the tube 11 (which space is provided to be filled by the substance 21).

In order to be able to access the needle 14, for example to push it into the septum 49 of the dilution bag 50, the tube 11 is cut in the neighborhood of its first end 16, then the end portion of the tube 11 which comprises the first end 16 is removed.

It will be noted that to push the needle 14 into the septum 49, the user can take up the straw 10 by the portion of the tube 11 which is in contact with the first portion 27 of the external surface 28, since the first portion 27 is for the most part smooth, the deformations of the tube 11 are limited when the latter is pressed upon at the location of the first portion 27, in particular when the needle 14 is pushed into the septum 49. This is favorable to the preservation of a fluid-tight contact between the tube 11 and the first portion 27.

FIGS. 7 to 10 illustrate a variant of the straw 10, similar to that described above (having in particular the same useful capacity of 2 ml) except that the tube 11 and the insert 12 are of different dimensions.

In this variant, the stopper 13 has a length of the order of 30 mm; the first portion 33 of the internal duct 20 has a length of the order of 18.80 mm; the part of the needle 14 projecting from the stopper 13 has a length of the order of 20 mm; and the tube 11 has an inside diameter of the order of 6.30 mm.

The length of the tube 11, the length of the part of the needle 14 molded over by the stopper 13, the diameter of the first portion 33 of the internal duct 20 and the diameter of the internal lumen 40 of the needle 14 are unchanged.

A description will now be given of the use of the straw 10 with the aid of FIGS. 1 to 9.

The straw 10 illustrated in FIGS. 1 and 2 is in the initial state, before use, the space between the second end 18 of the stopper 13 and the second end 17 of the tube 11 being empty (this space containing only air), the tube 11 being welded at its first end 16 and open at its second end 17.

The filling of the straw 10 is carried out using a filling needle (not illustrated), connected to a reservoir (not illustrated) of substance 21, which is inserted into the tube 11 by the end 17 of the tube 11 until its end comes near the stopper 13.

On injection of the substance 21, the filling needle is progressively retracted.

It will be noted that here, because of the welding of the first end 16 of the tube 11 and of the narrow character of the internal lumen 40 of the needle 14, the substance 21 penetrates into the internal duct 20 of the stopper 13 but does not penetrate, or penetrates extremely little, inside the internal lumen 40 of the needle 14, this being the case even though the internal lumen 40 opens into the internal space of the tube 11 at the distal end 19 of the needle 14.

In other words, the straw 10 is configured such that the dose of liquid-based substance 21 does not flow through the internal duct 24 when the first end 16 of the tube 11 is welded and the second end 17 of the tube 11 is open.

Due to the closure by welding of the first end 16 of the tube 11, and due to the contact between the tube 11 and the stopper 13 which is fluid-tight to gases and liquids, the internal space of the tube 11 situated between the first end 16 of the tube 11 and the first end 60 of the stopper 13 is closed with only the internal duct 24 of the insert, which is open, as an exit.

When the straw 10 is filled, the capillary forces in the duct 24 and/or the compression of the air trapped in the internal space of the tube 11 situated between the first end 16 of the tube 11 and the first end 60 of the stopper 13 oppose the advancement of the substance in the duct of the insert.

It is thus not useful to close the duct 24 to avoid the substance 21 passing through the insert 12 and entering the internal space of the tube situated between the first end of the tube and the first end of the stopper.

It will be furthermore noted that the volume of the injected predetermined dose is such that there remains a portion of the tube 11 towards the end 17 that is not filled by the substance 21.

The tube 11 is then welded in the neighborhood of its second end 17.

The straw 10 is then in the filled state illustrated in FIG. 3, in which the tube 11 is closed at each end by a weld 41.

Here, each weld 41 is formed using two heating jaws (not illustrated) between which an end portion of the tube 11 is crushed by pinching. The portion so crushed takes a flattened position by forming two lips placed in contact with each other. Simultaneously with the crushing, the heat transmitted by the heating jaws to the material of the tube 11 (here Surlyn®) leads to the formation of the sealing weld 41 between the two lips.

It will be noted that, given that there remains a portion of the tube 11 not filled with the substance 21, an air bubble 43 having a predetermined volume is trapped in the tube 11 between the weld 41 in the neighborhood of the end 17 and the dose of substance 21.

This air bubble 43 is useful on freezing the straw to permit the increase in volume of the substance 21.

A description will now be given of the emptying of the straw 10 with the aid of FIGS. 7 to 9.

To empty the straw 10, the tube 11 is first of all cut between its first end 16 and the cylindrical first portion 27 of the external surface 28 of the stopper 13, then the end portion of the tube 11 which had been cut is removed. The tube 11 is here more specifically cut at the location of the annular groove 30 of the stopper 13.

The straw 10 is disposed upright, with the point 19 of the needle 14 oriented downwards. In other words, the straw 10 is disposed such that the distal end 19 of the needle 14 is oriented downwards and the second end 17 of the tube 11 is oriented upwards.

The straw 10 is then in the state illustrated in FIGS. 7 and 8.

As for an ampule held upright with an open end situated at the bottom and a closed end situated at the top, the substance 21 does not flow through the internal duct 24.

The needle 14 is next, for example, pushed into the septum 49 of the dilution bag 50 (FIG. 9).

In this way, fluidic communication is established between the emptying needle 14 and the dilution bag 50.

In order for the substance 21 to be able to flow through the internal duct 24, the compartment of the straw 10 containing the substance 21 must be connected to the atmosphere.

For this, here, an opening 44 is made at the location of the air bubble 43, which is situated in the neighborhood of the end 17 of the tube 11 which is oriented upwards.

Once the opening 44 has been made, the liquid-based substance 21 is left to flow under gravity through the internal duct 24.

It will be noted that in order for the substance 21 to flow, the emptying needle 14 is at least partly above the dilution bag 50.

The straw 10 illustrated in FIG. 9 and shown in a state in which it is partially emptied of the dose of substance 21, which flows into the dilution bag 50 where it mixes with the dilution liquid (in the interest of simplicity, the content of bag 50 is not illustrated).

The emptying is thus carried out under gravity, without an action having to be carried out by the user, which is particularly simple and convenient.

What is more, this provides the advantage of minimizing the stress undergone by the substance which was preserved in the straw 10, which is particularly advantageous when it is a biological substance, for example concentrated vaccine.

Here, the speed of flow of the substance 21 is relatively slow, which is favorable to minimizing the stress undergone by the substance 21.

To make the opening 44, a device for connection to the atmosphere 45 is employed, which will be described below with reference to FIGS. 9 to 12.

The device for connection to the atmosphere 45 comprises a positioning member 46 for positioning the straw 10 configured to receive the straw 10 in a predetermined position, and an opening member 47 for opening the straw 10 configured to make an opening in the tube 11 of the straw 10 when the straw 10 is received in the positioning member 46 in the predetermined position.

The opening member 47 is configured here to make an opening in the neighborhood of the end 17 of the tube 11, in order for the opening 44 to be situated at the location of the air bubble 43.

The device for connection to the atmosphere 45 comprises a clamp 51 provided with a first branch 52 and with a second branch 53 which are rotatably mounted relative to each other at the location of a hinge 54 of the clamp 51.

The first branch 52 comprises a first jaw 55 and a first gripping lug 56 each extending from the hinge 54 on opposite sides of the latter.

The second branch 53 comprises a second jaw 57 and a second gripping lug 58 each extending from the hinge 54 on opposite sides of the latter.

For each of the branches 52 and 53, the respective gripping lug and jaw extend in general directions that are inclined relative to each other.

The clamp 51 is thus configured such that when the gripping lugs 56 and 58 are brought towards each other, the jaws 55 and 57 moved apart from each other to open the clamp 51 (FIGS. 10 to 12); whereas when the gripping lugs 56 and 58 are spread apart from each other, the jaws 55 and 57 come nearer to each other to close the clamp 51 (FIG. 9).

The clamp 51 further comprises an elastic member, formed here by a helical spring 59, interposed between the gripping lugs 56 and 58, and configured to deform when these latter are brought towards each other against the spring 59.

The clamp 51 is thus configured to close automatically when the jaws 55 and 57 have been moved away from each other to open the clamp 51.

The first jaw 55 comprises a first channel 62 extending longitudinally between a first end 68 oriented towards the hinge 54 and a second end 69 oriented away from the hinge 54; as well as a stop wall 63 situated between the first end 68 of the channel 62 and the hinge 54.

The stop wall 63 is situated more specifically at a location that is in line with the channel 62, and extends transversely to the longitudinal direction of extension of the channel 62.

The bottom of the channel 62 has a U-shaped section the concavity of which is directed towards the second jaw 57.

The channel 62 is configured to receive the straw 10 with its tube 11 positioned against the bottom of the channel 62.

The U-shape of the bottom substantially corresponds to the outside contour of the tube 11 such that the straw 10 is received in the channel in a fixed predetermined orientation.

More specifically, the straw 10 is oriented substantially parallel to the longitudinal direction of extension of the channel 62, and transversely to the direction of coming together/spreading apart of the jaws 55 and 57 of the clamp 51.

The straw 10 presents this predetermined orientation when it is in the predetermined position.

The stop wall 63 is configured to limit the pushing-in of the straw 10 into the channel 62 when the straw 10 has reached a predetermined position.

The first channel 62 and the stop wall 63 thus together form the positioning member 46 of the straw 10.

The second jaw 57 comprises a second channel 64 extending longitudinally between a first end 70 oriented towards the hinge 54 and a second end 71 oriented away from the hinge 54.

The channel 64 has a concavity directed towards the first jaw 55.

When the clamp 51 is closed, the first channel 62 and the second channel 64 extend along each other.

Figure 10:
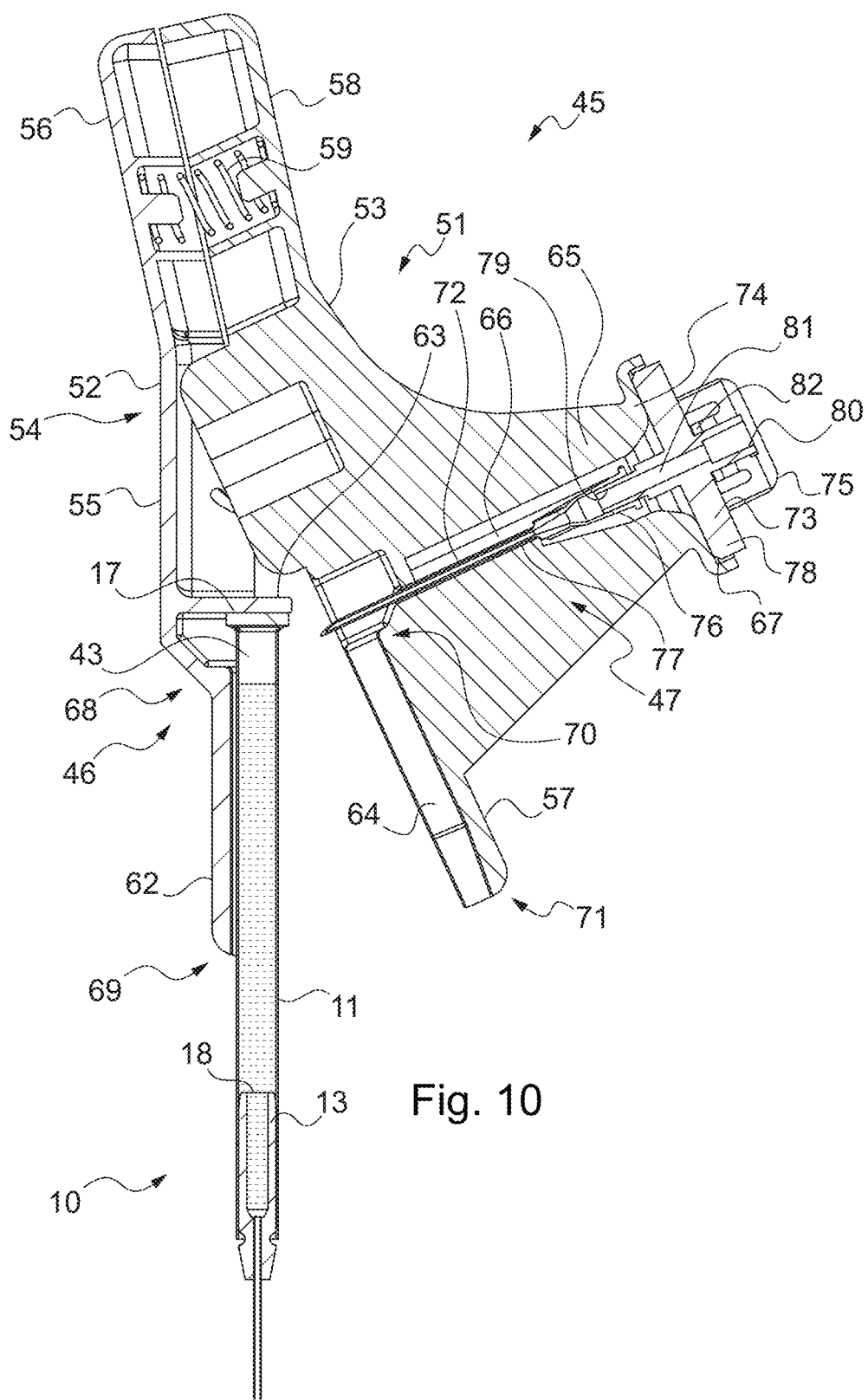
FIG. 10 is a view showing in similar manner to FIG. 9 the device for connection to the atmosphere and the straw, but in a configuration for putting the straw in place in the device.
Figure 11:
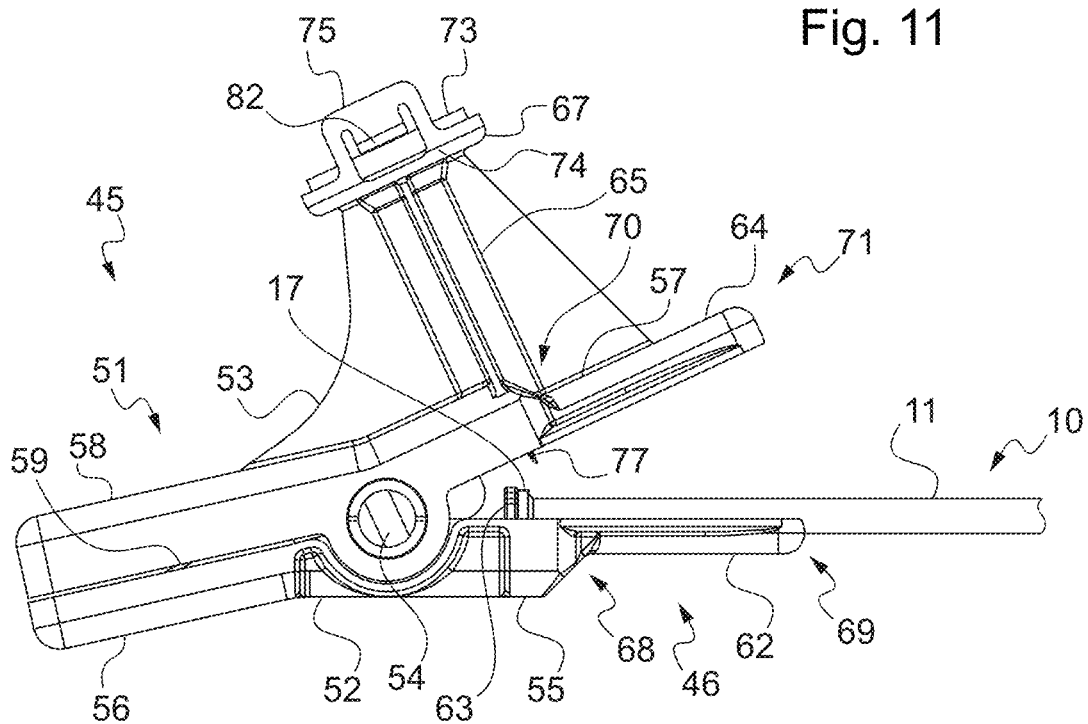
FIG. 11 is a similar view to FIG. 10 but in elevation.
Figure 12:
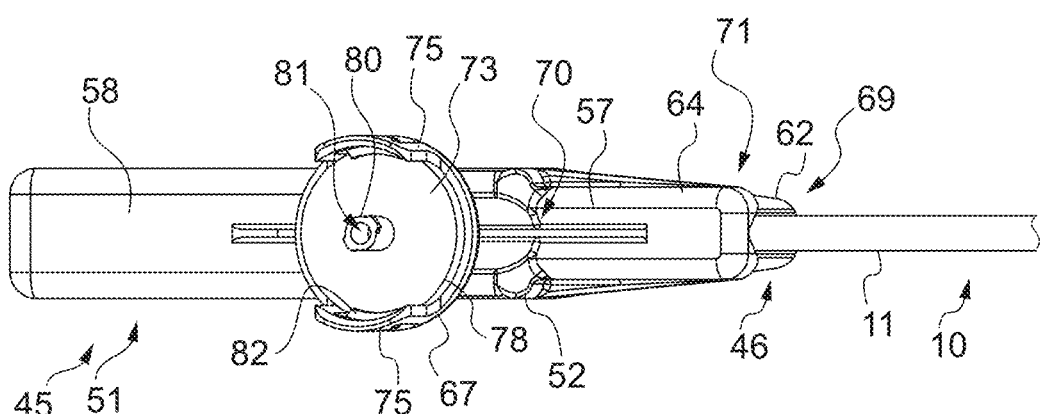
FIG. 12 shows the device as viewed from the side that can be seen at the top in FIG. 11.

When the clamp 51 is in an open configuration in which the jaws 55 and 57 are apart from each other, the straw 10 can be disposed between the jaws (FIG. 10).

More specifically, the second end 17 of the tube 11 of the straw 10 is inserted into the first channel 62 and slid within the latter until the second end 17 of the tube 11 is in contact with the stop wall 63.

The straw 10 is thus disposed in the predetermined position.

If the clamp 51 is then passed into a closed configuration in which the jaws 55 and 57 are near each other (FIG. 9), these latter hold the straw 10 in the channel 62, against the stop 63, and thus in the predetermined position.

The first channel 62 and the second channel 64 then each receive a respective portion of the tube 11 of the straw 10.

The second branch 53 further comprises a chimney 65 projecting from the second jaw 57 and extending substantially perpendicularly to the latter, as well as a platform 67 situated on the opposite end of the chimney 65 to the second jaw 57.

When the clamp 51 is closed (FIG. 9), the chimney 65 furthermore extends substantially perpendicularly to the first jaw 55.

The chimney 65 is provided with a through-duct 66 opening at the foot of the chimney 65 towards the jaw 55, and at the apex of the chimney 65 through the platform 67.

The platform 67 has a substantially circular central portion 74, and two snap-engagement lugs 75 extending transversely from the outside edge of the central portion 74 and disposed facing each other.

The snap-engagement lugs 75 have internal projections 82 which extend facing the central portion 74.

When the clamp 51 is closed (FIG. 9), the duct 66 opens at the foot of the chimney 65, in register with a space which is situated in the general direction of extension of the jaw 55, between the stop wall 63 and the first end 68 of the channel 62.

The chimney 65 and the platform 67 of the second branch 53 are configured for mounting the opening member 47 on the second jaw 57.

The device for connection to the atmosphere 45 further comprises a ventilation needle 72 and an air filter 73 connected to the needle 72, here forming the opening member 47.

The needle 72 comprises a female connector tip 76 and a hollow shaft 77 projecting from the female tip 76.

The hollow shaft 77 is similar here to that forming the needle 14 of the insert 12.

The hollow shaft 77 has an internal lumen extending from the female tip 76 to the point of the hollow shaft 77.

The air filter 73 is an axisymmetrical member having a substantially disk-shaped filtration part 78, a male connector tip 79 and a coaxially disposed inlet collar 80.

The male tip 79 and the collar 80 project from opposite sides of the filtration part 78.

The filter 73 furthermore has an internal lumen 81 passing through it and which is successively delimited by the collar 80, the filtration part 78 and the male tip 79.

The air filter 73 is configured to filter the air entering by the collar 80, passing through the filtration part 78 and exiting by the male tip 79.

The needle 72 is connected to the air filter 73 by engagement of the female connector tip 76 of the needle 72 on the male connector tip 79 of the filter 73.

The male and female connector tips 79 and 76 are of Luer type here, defined by the standard ISO 594-1:1986 or by the standards DIN and EN 1707:1996 and 20594-1:1993.

The air filter 73 is connected at an entrance of the internal lumen of the hollow shaft 77 of the needle 72, of which the exit is located at the point of the hollow shaft 77 of the needle 72.

The opening member 47 is mounted on the second jaw 57 of the clamp 51 such that the needle 72 is received in the duct 66 of the chimney 65, while the filtration part 78 of the air filter 73 is disposed against the central portion 74, between the snap-engagement lugs 75.

The filtration part 78 is furthermore sandwiched between the central portion 74 and the internal projections 82 of the snap-engagement lugs 75 of the platform 67, such that the opening member 47 is immobilized.

It will be noted that to dismantle the opening member 47 of the jaw 57, for example to clean and/or change the air filter 73 and/or the needle 72, it suffices to spread apart the snap-engagement lugs 75, which are flexible, to free the filtration part 78 from the internal projections 82.

The needle 72 is configured to pierce through the tube 11 of the straw 10 so as to make the opening 44.

When the jaws 55 and 57 are brought towards each other to pass the clamp 51 from its open configuration to its closed configuration, the point of the hollow shaft 77 pierces through the tube 11 of the straw 10, so forming the opening 44 in the tube 11.

The hollow shaft 77 projects into the internal space of the tube 11 such that its point is situated in the internal space of the tube 11, so establishing fluidic communication between the inside and the outside of the tube 11 through the internal lumen of the hollow shaft 77 and, here, also through the internal lumen 81 of the filter 73.

It will be noted that since the hollow shaft 77 passes through the opening 44, it can be considered that the fluidic communication is established through that opening 44.

The air filter 73, situated at an entrance of the internal lumen of the needle 72, is configured to filter the outside air passing into the tube 11 of the straw 10 through the internal lumen. The air filter 73 is in particular configured to filter possible infectious agents present in the air and which could contaminate the substance 21 on emptying the straw 10.

It will be further noted that the clamp 51 is configured such that when it is in closed configuration, the point of the hollow shaft 77 is situated near the stop wall 63, such that the opening 44 is made near the end 17 of the tube 11 that bears on the stop wall 63, so making it possible to pierce the tube 11 at the location of the air bubble 43.

The straw 10 and the device for connection to the atmosphere 45 together form a system for delivering the predetermined dose of liquid-based substance 21 received in the straw 10.

In variants not shown:
- the straw has a useful capacity different from 2 ml, for example 4 ml, the dimensions of the tube and/or of the insert being adapted accordingly, the inside diameter of the tube for example being greater; and more generally the dimensions of the straw are different from those mentioned above and illustrated in the drawings;
- the stopper has no recess set back relative to the external surface and the injection point is situated elsewhere than at the location of the cylindrical portion of the external surface;
- rather than extending only partially within the stopper, the needle passes through it entirely and furthermore projects from the second end of the stopper such that the proximal end of the needle is situated in the space between the second end of the stopper and the second end of the tube, the proximal end of the needle also being the second end of the insert;
- The needle is not molded over by the stopper but is for example bonded to the stopper which is obtained independently of the needle;
- the needle is not made from metal material, but for example from plastic material;
- the internal lumen of the emptying needle and/or of the ventilation needle does not open at the point of the needle but on the side of the needle at a point set back from the point of the needle;
- the opening for connection to the atmosphere of the straw is made by cutting an end portion of the tube comprising the second end of the tube, rather than by perforating the tube;
- the opening member has no filter;
- the opening member has no needle and comprises for example a pin or a blade; and/or
- the straw is emptied without the device for connection to the atmosphere, for example manually.

Numerous other variants are possible according to circumstances, and in this connection it is to be noted that the invention is not limited to the examples described and shown.

The invention claimed is:

1. A straw for the cryogenic preservation of a predetermined dose of liquid-based substance, comprising a tube extending between a first end and a second end, and a stopper disposed in said tube in the neighborhood of said first end of said tube and extending between a first end oriented towards the first end of said tube and a second end oriented towards the second end of said tube, said stopper being fixed relative to said tube and being passed through from said first end of said stopper to the second end of said stopper by a passage; characterized in that the straw further comprises an emptying needle comprising a first portion projecting from the first end of said stopper towards the first end of said tube and extending to a distal end situated in said tube, and comprising a second portion situated in said passage of the stopper, said emptying needle being permanently fastened to said stopper by the second portion of said emptying needle, said emptying needle and said stopper forming an insert entirely disposed in said tube and presenting an internal duct fluidically connecting the internal spaces of the tube situated on opposite sides of said insert, said internal duct being formed at least partly by the internal space of the emptying needle, which is hollow.

2. The straw according to claim 1, characterized in that said second portion of the emptying needle extends between the first end of the stopper and a proximal end situated in the stopper, said internal duct being formed by said passage between the proximal end of the emptying needle and the second end the stopper.

3. The straw according to claim 1, characterized in that the straw is in an initial state in which the first end said tube is welded, the second end of said tube is open, and the space between the second end said stopper and the second end of said tube is empty.

4. The straw according to claim 3, characterized in that in said initial state said internal duct of said insert is open and the space between the first end of said stopper and the first end of said tube only contains said emptying needle.

5. The straw according to claim 1, characterized in that the straw is in a filled state in which the first end of said tube is welded, the second end of said tube is welded, and the space between the second end of said stopper and the second end of said tube contains said predetermined dose of liquid-based substance.

6. The straw according to claim 5, characterized in that in said filled state said internal duct said insert is open and the space between the first end of said stopper and the first end of said tube only contains said emptying needle.

7. The straw according to claim 1, characterized in that said stopper comprises an annular groove on an external surface of said stopper, and comprises from said annular groove to said first end an appendix of which the external surface is away from the internal surface of said tube.

8. The straw according to claim 1, characterized in that said stopper comprises a cylindrical portion on an external surface of said stopper, in tight contact with the internal surface of said tube.

9. An assembly comprising a straw according to claim 1 and a device for connection to the atmosphere of said straw comprising a positioning member said straw configured to receive said straw in a predetermined position, and an opening member of said straw configured to make an opening in the tube of said straw when said straw is received in said positioning member in said predetermined position.

10. The assembly according to claim 9, characterized in that said positioning member comprises a channel configured to receive said straw in a predetermined orientation which said straw presents when the straw is in said predetermined position, and a stop wall situated at a location that is in line with said channel and configured to limit the pushing-in of said straw into said channel when said straw is pushed into said channel and reaches said predetermined position.

11. The assembly according to claim 9, characterized in that said opening member comprises a ventilation needle provided with an internal lumen and configured to pierce through the tube of said straw so as to make said opening; and said opening member further comprises an air filter situated at an entrance of said internal lumen.

12. The assembly according to claim 9, characterized in that said device for connection to the atmosphere comprises a clamp provided with a first jaw and with a second jaw, said clamp having an open configuration in which said jaws are away from each other and said straw can be disposed between said jaws, and a closed configuration in which said jaws are near each other and are configured to hold said straw received in said positioning member in said predetermined position, said positioning member being situated on said first jaw and said opening member being situated on said second jaw, and said clamp is configured such that said opening member makes said opening in the tube of said straw when said jaws are brought towards each other to pass said clamp from the open configuration of said clamp to the closed configuration of said clamp.

13. A method for emptying a straw according to claim 1, comprising the steps of:
  selecting a said straw in which the second end said tube is welded, and the space between the second end of said stopper and the second end of said tube contains said predetermined dose of liquid-based substance;
  establishing fluidic communication between said emptying needle and a vessel into which said predetermined dose of liquid-based substance is to be transferred, said straw being disposed such that the distal end of said emptying needle is oriented downward while being at least partly over said vessel and such that the second end said tube is oriented upward;
  making an opening in the tube of said straw to connect said predetermined dose of liquid-based substance to atmosphere, and leave said liquid-based substance to run by gravity through the internal duct of said insert.

14. The method according to claim 13, characterized in that the method comprises the step of selecting said straw with an air bubble trapped between the dose of liquid-based substance and the second end of said tube and the step of making said opening at the location of said air bubble.

15. The method according to claim 13, characterized in that, before making said opening, said emptying needle is pushed into a septum of said vessel.

* * * * *